United States Patent
Yadav et al.

(10) Patent No.: US 6,879,587 B1
(45) Date of Patent: Apr. 12, 2005

(54) PACKET PROCESSING IN A ROUTER ARCHITECTURE

(75) Inventors: Satyendra Yadav, Portland, OR (US); Kapil Jain, Hillsboro, OR (US); Anand Rangarajan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 09/608,307

(22) Filed: Jun. 30, 2000

(51) Int. Cl.[7] .................. H04L 12/56; H04L 12/66; G06F 15/16; G06F 15/173

(52) U.S. Cl. ............... 370/389; 370/353; 370/390; 370/401; 709/216; 709/226

(58) Field of Search .............. 370/353–394, 370/401, 402, 466–474, 285, 349; 709/217–239

(56) References Cited

U.S. PATENT DOCUMENTS

| | | | | |
|---|---|---|---|---|
| 5,185,742 A | * | 2/1993 | Bales et al. ............ | 370/469 |
| 5,734,828 A | | 3/1998 | Pendse et al. | |
| 5,867,666 A | * | 2/1999 | Harvey ................ | 709/239 |
| 5,970,066 A | * | 10/1999 | Lowry et al. .......... | 370/353 |
| 5,991,797 A | * | 11/1999 | Futral et al. .......... | 709/216 |
| 6,044,415 A | * | 3/2000 | Futral et al. .......... | 710/33 |
| 6,330,599 B1 | * | 12/2001 | Harvey ................ | 709/223 |
| 6,347,337 B1 | * | 2/2002 | Shah et al. ........... | 709/224 |
| 6,434,612 B1 | * | 8/2002 | Hughes et al. ........ | 709/223 |
| 6,460,080 B1 | * | 10/2002 | Shah et al. ........... | 709/224 |
| 6,507,863 B2 | * | 1/2003 | Novaes ................ | 709/201 |
| 6,510,159 B1 | * | 1/2003 | Noriyuki .............. | 370/401 |
| 6,553,005 B1 | * | 4/2003 | Skirmont et al. ..... | 370/285 |
| 6,647,423 B2 | * | 11/2003 | Regnier et al. ....... | 709/229 |
| 6,711,163 B1 | * | 3/2004 | Reid et al. ............ | 370/390 |
| 6,718,370 B1 | * | 4/2004 | Coffman et al. ...... | 709/212 |

OTHER PUBLICATIONS

P. Newman et al., "Ipsilon's General Switch Management Protocol Specification Version 2.0", RFC 2297, Ipsilon's General Switch Management, Mar. 1998, ftp://frp.rfc.org/in-notes-rfc2297.txt.

* cited by examiner

*Primary Examiner*—Man U. Phan
(74) *Attorney, Agent, or Firm*—Fish & Richardson P.C.

(57) ABSTRACT

A routing architecture comprising at least one or more switches for packet switching and a controller for controlling the switches is proposed. A packet is received by the controller through the switch as if the switch is located in the controller.

27 Claims, 2 Drawing Sheets

PACKET PROCESSING IN A ROUTER ARCHITECTURE

BACKGROUND

This invention relates to packet processing in a router architecture.

A conventional single-box router processes packets that need to be switched (or forwarded) as well as packets that contain control information called control packets for computing routing tables. A routing table keeps track of routes to particular network destinations. Packet switching includes the sending of data information in packets, through a network, to a remote location. Each packet of data information has a unique source address and carries its own destination address.

A conventional router has a device-driver that controls network interface cards located in the router. The device-driver handles communication between the interface cards between remotely located devices and a networking stack in the router. The networking stack is a stack of software layers such as IP (internet protocol), TCP/UDP (transmission control protocol/user datagram protocol), and socket library (application programming interface library) between networking applications and the device-driver. A packet traverses the networking stack to be delivered to a networking application, which handles the processing of control packets of a networking device.

DETAILED DESCRIPTION

Figure 1:
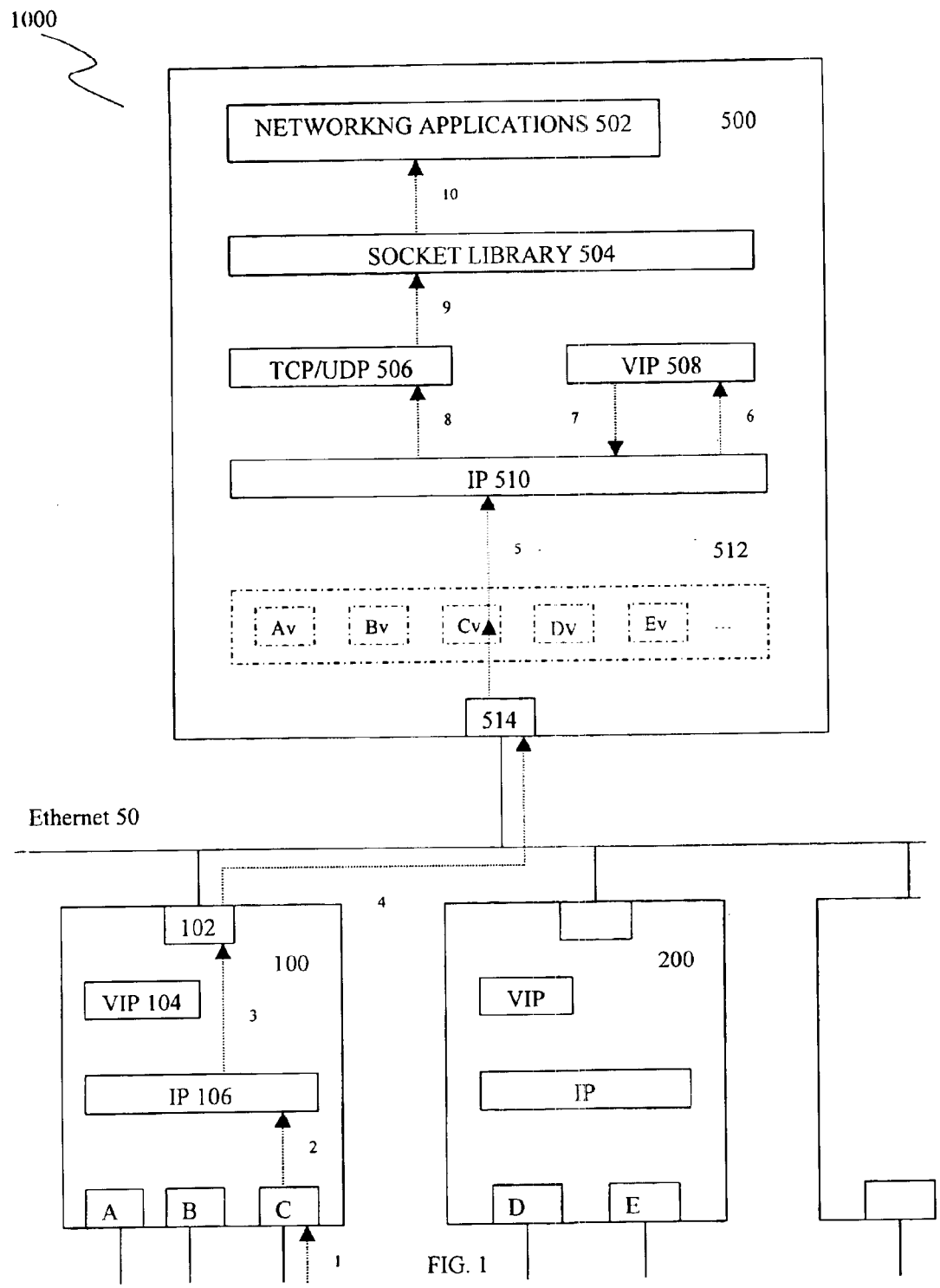
FIGS. 1 and 2 illustrate receiving and transmitting a packet in a distributed router architecture according to an embodiment of the invention.

A router architecture described below separates the processing of packet switching (or forwarding) from the processing of control packets. FIG. 1 shows an implementation of a distributed router architecture 1000 in which switches 100, 200 for handling packet switching and a controller 500 for processing control packets are distributed across a network such as an Ethernet network 50. The controller 500 controls the switches 100, 200.

The distributed router architecture 1000 may be made compatible with networking applications 502, such as telnet, that work in a conventional router. One way is by keeping the distributed switches 100, 200 as hidden from the networking applications 502. Otherwise, the networking applications 502 would require modification to work under the distributed architecture. Hiding the fact that the switches 100, 200 are distributed can provide a single router view of the switches 100, 200 to the networking applications 502. From the perspective of the networking applications 502, packets may appear to come from a router and not through a separate switch.

A known single-box router contains network interfaces, each controlled by a device-driver. In the distributed router architecture 1000, the network interfaces that communicate with other routers or hosts are placed in the switches 100, 200, but not in the controller 500. FIG. 1 shows network interfaces A, B, and C located in the switch 200 and network interfaces D and E located in the switch 100. To "hide" the fact that the switches are distributed over the Ethernet 50, a pseudo device-driver 512 can be introduced in the controller 500. The pseudo device-driver 512 causes control packets, which are packets containing routing information for computing routing tables, to be delivered to the networking stack (e.g. socket library 504, TCP/UDP 506, and IP 510) of the controller 500 as if coming from virtual interfaces Av, Bv, Cv, Dv, or Ev in the pseudo device-driver 512. Each virtual interface corresponds to an interface present in a switch. For example, the virtual interface Av in the controller 500 corresponds to the interface A in the switch 100, and so on. To the networking applications 502, the controller 500 appears to be a conventional single-box router with as many interfaces as there are in all the switches.

A control packet that is received by one of switch's interfaces can be relayed to the controller 500 and appear as input to its corresponding virtual interface. Conversely, a control packet sent out through one of the virtual interfaces in the controller 500 can be relayed to an appropriate switch containing the corresponding interface. The receiving and sending of packets as described above can be accomplished using an IP encapsulation protocol termed a virtual interface protocol (VIP). The VIP is implemented by a VIP module 508 located in the controller 500 and VIP modules 104 and 204 located in the switches 100 and 200, respectively. The encapsulation carries frames of one protocol which includes as the data in another protocol.

FIG. 1 illustrates how a control packet is received by the switch 100 that appears to reside in the controller 500 and delivered to a networking application 502. In phase 1, the switch 100 receives a packet through the interface C. In phase 2, the switch 100 appends an external IP header to the packet and delivers the packet to the IP module 106. A protocol field in the external IP header is filled with information regarding the VIP. The external header provides the destination address of the controller 500. In phase 3, the IP module 106, which has access to a routing table, performs route lookup for the controller 500 and sends the packet through an interface 102 specified in the routing table. In phase 4, the packet reaches the controller 500 at an interface 514 from the interface 102 and is delivered to the interface CV in the pseudo device driver 512. In phase 5, the interface Cv in the pseudo device-driver 512 delivers the packet to the IP module 510. In phase 6, the IP module 510 delivers the packet to a VIP module 508 based on the protocol field in the external IP header. In phase 7, the VIP module 508 strips off the external IP header and delivers the packet to the IP module 510. The packet is delivered to the IP module 510 as if it were coming from the virtual interface Cv corresponding to the interface C in the switch 100. In phases 8 to 10, the packet traverses the networking stack—IP 510, TCP/UDP 506, and Socket library 504—and the data is delivered to the application 502.

Figure 2:
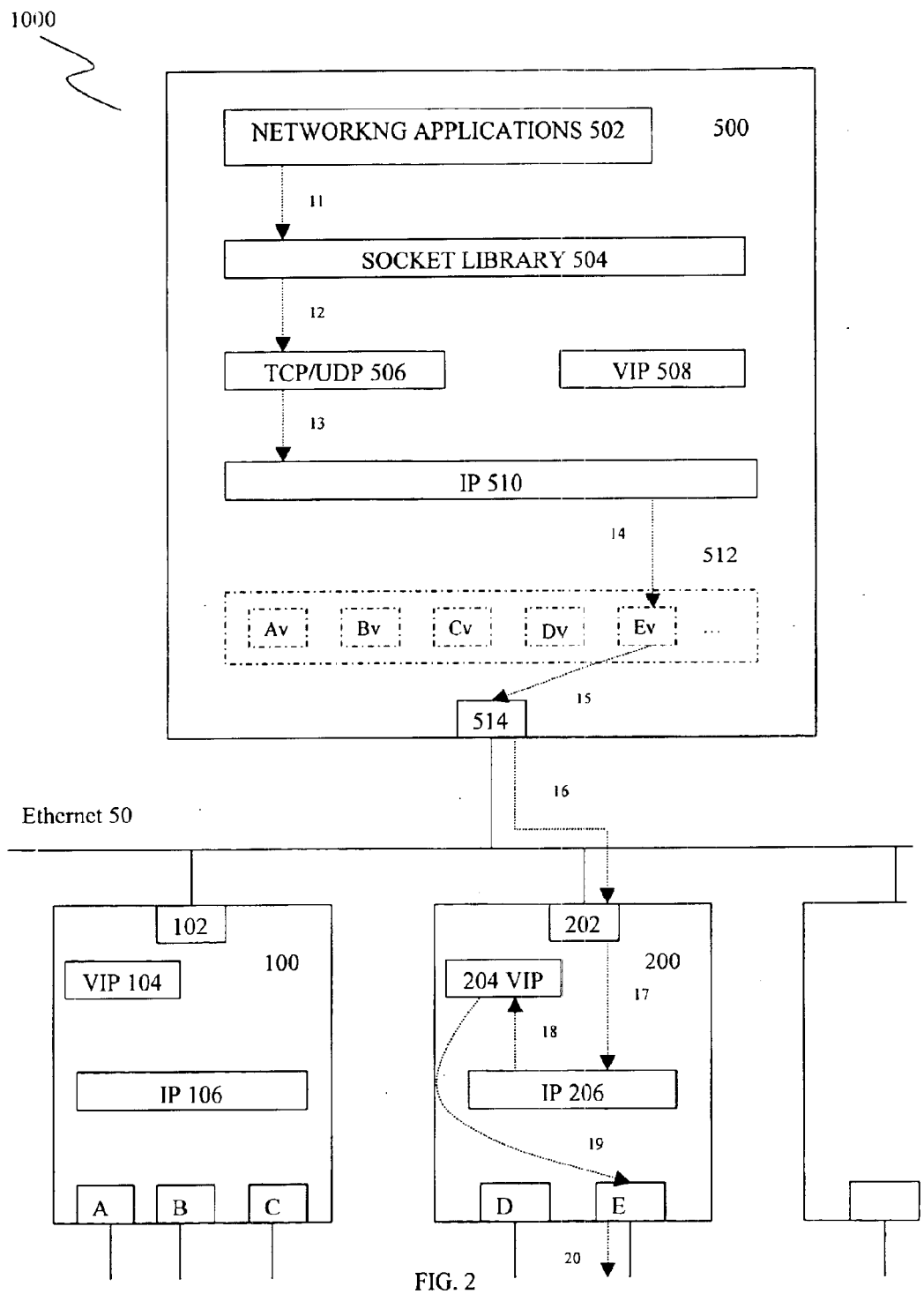

FIG. 2 illustrates how a control packet is transmitted from a networking application 502. In phases 11 to 13, a packet is written by the application 502 using the socket library 504 and gets encapsulated by the TCP/UDP module 506. It is then given to the IP module 510. In phase 14, the IP module 510 appends an IP header and performs route lookup for the destination and sends it through the appropriate interface in the pseudo device-driver specified in the routing table. A conventional single-box router software can be used to compute the routing table for the pseudo or actual interfaces of distributed switches. In FIG. 2, the interface Ev is assumed to be the appropriate virtual interface. In phase 15, the pseudo device-driver 512 appends an external IP header to the packet. The destination address contained in the external IP header is that of the switch 200 that contains the interface E, which corresponds to the virtual interface Ev. The protocol field of the external IP header is filled with information regarding the VIP. The pseudo device-driver 512 performs a route lookup for the destination switch 200 and sends the packet to the switch 200 through the interface 514. In phase 16, the packet reaches the switch 200 at an interface device-driver 202. In phase 17, the interface device-driver 202 delivers the packet to an IP module 206. The IP module 206 in phase 18 sends the packet to a VIP module 204 based on the protocol field in the external IP header. In phase 19, the VIP module 204 strips off the external IP header. It then looks into the internal IP header for a source IP address. This source IP address corresponds to one of the network interfaces, the network interface E. In phase 20, the packet is sent out through the corresponding interface E to a network interface.

In the foregoing example, the controller 500 and the switches 100, 200 were distributed across the Ethernet 50. However, the controller 500 and the switches 100, 200 can be tightly coupled using a high-speed switching fabric instead of being distributed. The routing architecture and the method described above can also be employed for the tightly coupled controller and the switches.

Routing architectures represented by the distributed architecture 1000 and the tightly coupled architecture are scalable, provide a single point of management at the controller, and reduce the load on the network. Additionally, the logic circuit of the switches 100, 200 can be made simpler and more efficient. The foregoing distributed architecture can be implemented in any Network Operating System (NOS) without any changes to its networking stack and routing infrastructure such as routing protocols or a routing table manager. Any networking application that works in an NOS will work without any changes in the exemplary disclosed architecture. The distributed architecture would also be useful in creating a number of applications such as firewalls for distributed switches with the feature of single point management.

The foregoing techniques can be implemented, for example, in a computer program executable on a computer. The computer program can be stored on a storage medium, such as random access memory (RAM), readable by a general or special purpose programmable computer, for routing packets under the exemplary disclosed architecture.

Other implementations are within the scope of the following claims.

What is claimed is:

1. A routing system comprising:
    a switch configured to process network packets, including distinguishing between data packets and control packets in the network packets and sending a control packet; and
    a controller, separate from the switch, and operatively connected to the switch, and configured to receive the control packet from the switch and deliver the control packet to a network stack of the controller such that a networking application of the controller views the control packet as if the control packet came directly from a local interface, the local interface being a virtual interface of the controller that corresponds to a physical interface of the switch.

2. The routing system of claim 1 wherein the switch has interfaces, each interface corresponding to a virtual interface in the controller.

3. The routing system of claim 2 wherein the switch includes a routing mechanism which sends packets to a corresponding virtual interface of the controller.

4. The routing system of claim 1 comprising multiple switches and wherein the controller is configured to control each of the multiple switches.

5. The routing system of claim 1 wherein the controller is operatively connected to the switch through a device communication medium comprising a high-speed switching fabric.

6. The routing system of claim 1 wherein the controller is operatively connected to the switch through a device communication medium comprising Ethernet.

7. The routing system of claim 1 wherein the network packets comprise Internet Protocol packets.

8. A routing system comprising:
    a switch configured to process network packets, including distinguishing between data packets to be handled locally and control packets to be forwarded, the switch comprising multiple physical interfaces; and
    a controller, separate from the switch, operatively connected to the switch, and configured to receive the control packets, the controller comprising one or more pseudo device drivers providing multiple virtual interfaces corresponding respectively to the multiple physical interfaces of the switch, and the controller being configured to control the switch by sending control information to the switch through an appropriate virtual interface of the one or more pseudo device drivers.

9. The routing system of claim 8 wherein the switch is arranged to strip address information associated with the switch from the control information received from the controller.

10. The routing system of claim 8 comprising multiple switches and wherein the controller is configured to control the switches.

11. The routing system of claim 8 wherein the controller is operatively connected to the switch through a device communication medium comprising a high-speed switching fabric.

12. The routing system of claim 8 wherein the controller is operatively connected to the switch through a device communication medium comprising Ethernet.

13. The routing system of claim 8 wherein the controller comprises an Internet Protocol networking stack.

14. The routing system of claim 1, wherein the switch is further configured to add information to the control packets before sending the control packets to the controller, the information comprising a destination address of the controller and protocol information that causes the control packets to be processed at the controller through a virtual interface protocol module of the controller, and the controller comprises the virtual interface protocol module configured to remove at least a portion of the information added at the switch and to deliver the control packets to the network stack.

15. The routing system of claim 8, wherein the controller is further configured to add information to the control information before sending the control information to the switch, the added information comprising a destination address of the switch and protocol information that causes the control information to be processed at the switch through a virtual interface protocol module of the switch, and the switch comprises the virtual interface protocol module configured to remove at least a portion of the added information and to send the control information through a physical interface of the switch corresponding to the appropriate virtual interface of the one or more pseudo device drivers.

16. A method comprising:
    employing a pseudo device driver in a controller of a distributed Internet Protocol router to provide a single-router view of multiple Internet Protocol switches to a network application of the controller, the distributed Internet Protocol router comprising the Internet Protocol switches and the controller operatively connected through a device communication medium.

17. The method of claim 16, further comprising:

distinguishing, in one of the Internet Protocol switches, between data packets and control packets received through a physical network interface of the one switch;

adding information to the control packets that causes the control packets to be processed in the controller such that the control packets appear to be received at the controller through a virtual network interface of the controller that corresponds to the physical network interface of the one switch; and sending the control packets having the added information to the controller.

18. The method of claim 16, wherein employing the pseudo device driver comprises:

distinguishing, in the controller, among received control packets based upon information previously added to the control packets in the Internet Protocol switches; and delivering the control packets to a module of the controller such that the control packets appear to be received at the controller through virtual network interfaces of the controller that correspond to physical network interfaces of the Internet Protocol switches.

19. The method of claim 16, wherein employing the pseudo device driver comprises:

receiving, within the controller, a control packet from the network application through a virtual network interface of the pseudo device driver; and adding information to the control packet that causes the control packet to be routed to a switch that includes a physical network interface corresponding to the virtual network interface and that causes the control packet, after being received at the switch, to be sent through the physical network interface, the switch being one of the Internet Protocol switches; and sending the control packet having the added information to the switch.

20. The method of claim 16, wherein the device communication medium comprises a high-speed switching fabric.

21. The method of claim 16, wherein the device communication medium comprises Ethernet.

22. An article comprising a machine-readable medium embodying information indicative of instructions that when performed by one or more machines result in operations comprising:

employing a pseudo device driver in a controller of a distributed Internet Protocol router to provide a single-router view of multiple Internet Protocol switches to a network application of the controller, the distributed Internet Protocol router comprising the Internet Protocol switches and the controller operatively connected through a device communication medium.

23. The article of claim 22, wherein the operations further comprise:

distinguishing, in one of the Internet Protocol switches, between data packets and control packets received through a physical network interface of the one switch;

adding information to the control packets that causes the control packets to be processed in the controller such that the control packets appear to be received at the controller through a virtual network interface of the controller that corresponds to the physical network interface of the one switch; and sending the control packets having the added information to the controller.

24. The article of claim 22, wherein employing the pseudo device driver comprises:

distinguishing, in the controller, among received control packets based upon information previously added to the control packets in the Internet Protocol switches; and delivering the control packets to a module of the controller such that the control packets appear to be received at the controller through virtual network interfaces of the controller that correspond to physical network interfaces of the Internet Protocol switches.

25. The article of claim 22, wherein employing the pseudo device driver comprises:

receiving, within the controller, a control packet from the network application through a virtual network interface of the pseudo device driver; and adding information to the control packet that causes the control packet to be routed to a switch that includes a physical network interface corresponding to the virtual network interface and that causes the control packet, after being received at the switch, to be sent through the physical network interface, the switch being one of the Internet Protocol switches; and sending the control packet having the added information to the switch.

26. The article of claim 22, wherein the device communication medium comprises a high-speed switching fabric.

27. The article of claim 22, wherein the device communication medium comprises Ethernet.

* * * * *